(12) United States Patent
Berens

(10) Patent No.: US 10,024,363 B2
(45) Date of Patent: Jul. 17, 2018

(54) ROLLING BEARING ASSEMBLY

(71) Applicant: Frank Berens, Saunay (FR)

(72) Inventor: Frank Berens, Saunay (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/222,069

(22) Filed: Jul. 28, 2016

(65) Prior Publication Data

US 2017/0030410 A1  Feb. 2, 2017

(30) Foreign Application Priority Data

Jul. 29, 2015 (FR) ..................................... 15 57243

(51) Int. Cl.
| | | |
|---|---|---|
| *F16C 33/76* | (2006.01) | |
| *F16C 33/78* | (2006.01) | |
| *F16C 19/06* | (2006.01) | |
| *F16C 35/073* | (2006.01) | |
| *F16C 35/077* | (2006.01) | |

(52) U.S. Cl.
CPC ............ *F16C 33/767* (2013.01); *F16C 19/06* (2013.01); *F16C 33/782* (2013.01); *F16C 33/7886* (2013.01); *F16C 35/073* (2013.01); *F16C 35/077* (2013.01); *F16C 33/783* (2013.01)

(58) Field of Classification Search
CPC ........ F16C 33/72; F16C 33/76; F16C 33/767; F16C 33/78; F16C 33/7816; F16C 33/782; F16C 33/7823; F16C 33/7826; F16C 33/783; F16C 33/784; F16C 33/7859; F16C 33/7863; F16C 33/7866; F16C 33/7879; F16C 33/7896; F16C 19/02; F16C 35/073; F16C 35/077; F16J 15/3204;
(Continued)

(56) References Cited

U.S. PATENT DOCUMENTS

| | | | | | |
|---|---|---|---|---|---|
| 2,428,041 | A | * | 9/1947 | Saywell | .................. F16C 33/78 |
| | | | | | 277/367 |
| 2,600,434 | A | * | 6/1952 | Saywell | ................ F16C 33/782 |
| | | | | | 277/366 |

(Continued)

FOREIGN PATENT DOCUMENTS

| | | | | |
|---|---|---|---|---|
| BE | 494855 A | | 6/1950 | |
| DE | 4224695 A1 | * | 1/1994 | ............ F16C 19/166 |

(Continued)

*Primary Examiner* — Alan B Waits
(74) *Attorney, Agent, or Firm* — Bryan Peckjian; SKF USA Inc. Patent Dept.

(57) ABSTRACT

A rolling bearing assembly including a rolling bearing provided with a first race having a bore, two front edges and an outer cylindrical surface, and with a second race provided with a bore, two front edges and an outer cylindrical surface. The first and second races rotate relatively about a central axis. The assembly is intended to be mounted in a housing. The assembly provides at least one first annular flange that is secured to the first race and at least partially covers a front edge of the first race, and at least one second annular flange that is secured to the second race and at least partially covers a front edge of the second race. Free ends of the first and second annular flanges are in sliding contact. The difference in dimensions between the housing and the rolling bearing is compensated by the flanges.

4 Claims, 3 Drawing Sheets

(58) Field of Classification Search
CPC .. F16J 15/3208; F16J 15/3224; F16J 15/3228; F16J 15/3232; F16J 15/3256; F16J 15/3268
See application file for complete search history.

(56) References Cited

U.S. PATENT DOCUMENTS

| | | | | |
|---|---|---|---|---|
| 2,661,226 A * | 12/1953 | Saywell | ............... | F16C 33/78 277/367 |
| 2,706,650 A * | 4/1955 | Saywell | ............... | F16J 15/3456 277/366 |
| 2,986,432 A * | 5/1961 | Schlauch | ............... | F16C 27/066 384/536 |
| 3,097,896 A * | 7/1963 | Wasley | ............... | F16C 23/086 277/361 |
| 3,141,708 A * | 7/1964 | Evangelista | ............... | F16C 23/086 384/132 |
| 3,415,500 A * | 12/1968 | Pethis | ............... | F16C 27/066 126/113 |
| 3,476,395 A * | 11/1969 | Cornelius | ............... | F16C 33/76 277/350 |
| 3,519,316 A | 7/1970 | Gothberg | | |
| 3,713,707 A * | 1/1973 | Bennett | ............... | E21B 10/25 277/336 |
| 4,727,970 A * | 3/1988 | Reik | ............... | F16C 19/52 192/110 B |
| 4,790,543 A * | 12/1988 | Wittmeyer | ............... | F16C 23/086 277/367 |
| 4,854,751 A * | 8/1989 | Grassmuck | ............... | F16C 27/066 384/476 |
| 5,002,406 A * | 3/1991 | Morton | ............... | F16C 23/086 384/477 |
| 5,005,992 A * | 4/1991 | Dreschmann | ............... | F16C 23/086 384/482 |
| 5,044,782 A * | 9/1991 | Jankowski | ............... | F16C 33/7813 384/477 |
| 5,110,222 A * | 5/1992 | Johnson | ............... | F16J 15/3456 277/402 |
| 5,533,815 A * | 7/1996 | Schierling | ............... | F16C 27/066 192/207 |
| 8,807,841 B2 * | 8/2014 | Gallucci | ............... | F16C 33/62 384/492 |
| 9,206,841 B2 * | 12/2015 | Cordier | ............... | F16C 19/163 |

FOREIGN PATENT DOCUMENTS

| | | | |
|---|---|---|---|
| DE | 102011103441 A1 | 12/2012 | |
| FR | 2199081 A2 | 4/1974 | |
| GB | 1446749 A * | 8/1976 | ............ F16C 33/761 |
| JP | H0471817 U | 6/1992 | |
| WO | WO-2009109162 A2 * | 9/2009 | ............ F16C 33/7886 |

* cited by examiner

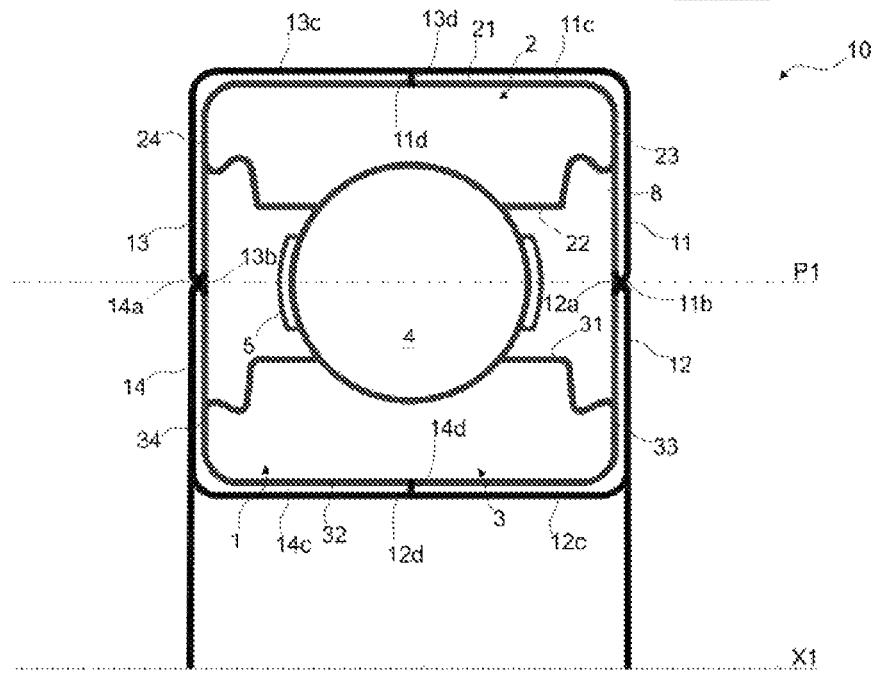
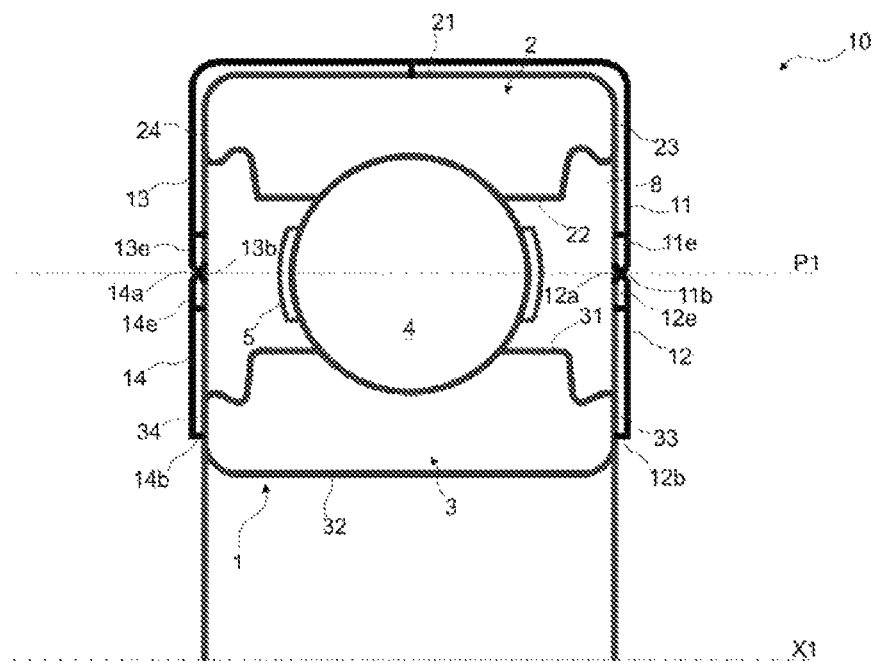

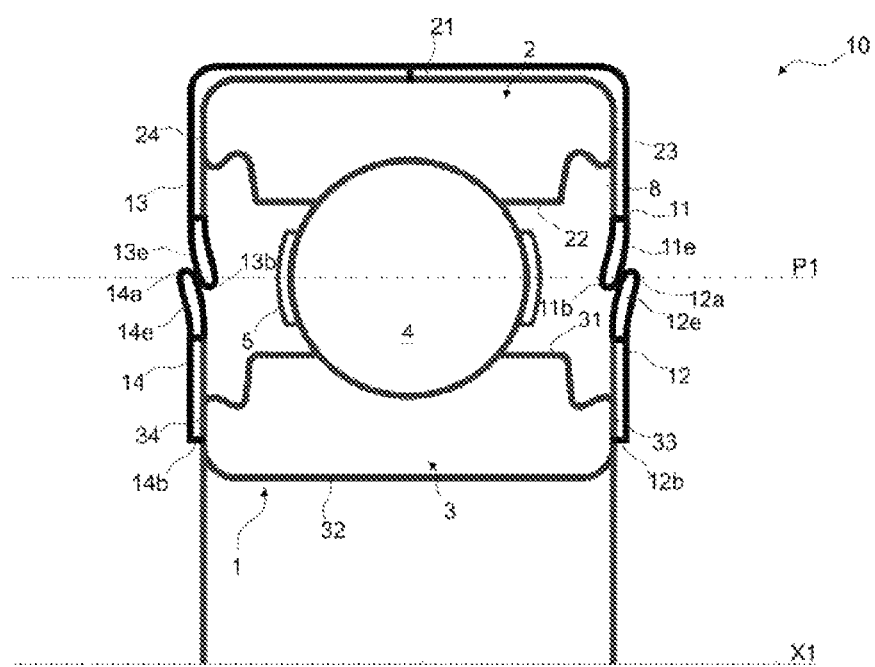

ROLLING BEARING ASSEMBLY

CROSS REFERENCE TO RELATED APPLICATIONS

This application claims priority to French patent application no. 1557243 filed on Jul. 29, 2015, the contents of which are fully incorporated herein by reference.

FIELD OF THE INVENTION

The present invention relates to an assembly comprising a rolling bearing.

A rolling bearing generally provides an inner race and an outer race, the races being in relative rotation with respect to one another. Between one another, the races can define a bearing chamber in which the rolling elements, such as balls, needles, rollers, are housed.

BACKGROUND OF THE INVENTION

A rolling bearing is intended to be mounted in a housing of a mechanical system, between a fixed mechanical element and a rotary mechanical element so as to support the relative rotation thereof.

The design of a rolling bearing, more specifically the type of rolling bearing, the number of rows of rolling elements, the type of rolling elements, the size of the races and of the rolling elements, depends on the application of the mechanical system. The conditions relating to torque, rotational speed, load, environment or even the available space in the housing have an effect on the rolling bearing and are thus design constraints therefor.

However, manufacturers of mechanical systems and/or rolling bearings can change their ranges and lose compatibility.

The features of a rolling bearing may have been improved, but it still has the same housing, whereas a housing with smaller dimensions could be suitable.

BRIEF SUMMARY OF THE INVENTION

According to U.S. Pat. No. 3,519,316, it is known practice to provide a rolling bearing assembly made of a pair of annular flanges, a first flange being mounted against a front edge of the outer race of the rolling bearing and securely fixed to the outer cylindrical surface of the race, and a second flange being mounted against a front edge of the inner race of the rolling bearing and securely fixed to the inner cylindrical bore of the race. The two races come into sliding contact and provide sealing for the rolling bearing. However, the fixing means make it necessary to provide grooves in the races that are designed to cooperate with ridges provided on fixing portions of the flanges.

It is known practice, from FR-A1-2 199 081 and DE-A1-10 2010 103 441, to provide such a sealing device with two pairs of flanges, on each side of the rolling bearing. In these devices, the rolling bearings do not need to be changed in any way and the flanges can be added a posteriori to the design and manufacture of the rolling bearing. However, it is necessary to provide specific fixing means for fixing to the radial edges of the races.

It is to these problems that the invention is intended more particularly to respond, by providing a rolling bearing assembly that is simple to produce and to mount, and is modular in terms of its use and its adaptation to several applications.

To this end, the invention relates to a rolling bearing assembly comprising a rolling bearing provided with a first race provided with a bore, two front edges, an outer cylindrical surface, and two flanges that are secured to the first race and each cover a front edge of the first race. The rolling bearing also provides a second race provided with a bore, two front edges, an outer cylindrical surface, and two flanges that are secured to the second race and each cover a front edge of the second race. The first and second races may be in relative rotation about a central axis. The assembly is intended to be mounted in a housing. The free ends of an annular flange of the first race and of an annular flange of the second race are in sliding contact. A difference in dimensions between the housing and the rolling bearing is compensated by the flanges.

In accordance with the invention, each of the two flanges of at least one race extends with a portion at least partially covering an annular cylindrical surface of the race, the portions extending from the two flanges of one and the same race being secured together.

By virtue of the invention, the difference in dimensions between the rolling bearing and the housing in which the rolling bearing is intended to be mounted is compensated by the thickness of the flanges mounted securely on the two races. More specifically, the flanges act as contact surfaces with the housing instead of the front edges of the races of the rolling bearing.

A standard rolling bearing of reduced size can be adapted to further applications without the overall mechanical system having to be modified. This allows a reduction in time and the design costs of the mechanical system. In addition, if the dimensions of the housing are outside a predefined range, it is possible to adapt a standard rolling bearing to the range.

The invention also makes it possible to adapt a rolling bearing of reduced size instead of a rolling bearing with larger dimensions but incorporating additional functionalities by virtue of the flanges.

Another advantage is that no modifications are made to the standard rolling bearing. The flanges are mounted on the races a posteriori to the design and manufacture of the rolling bearing. The flanges are mounted outside the rolling bearing.

Furthermore, since the flanges of the two races are in sliding contact with one another, the rolling bearing can be sealed. It may then be unnecessary to provide sealing means inside the rolling bearing, such as lip seals mounted in one race and in sliding contact or forming a labyrinth with the other race. By contrast, the rolling bearing can be equipped with such sealing means in addition to the flanges so as to increase the sealing of the rolling bearing in particularly critical environments (pollution, water, dust, particles).

According to advantageous but non-obligatory aspects of the invention, such a rolling bearing assembly may include one or more of the following features in any technically feasible combination:

- A bearing chamber is defined between the first and second races of the rolling bearing, at least one row of rolling elements being housed therein.
- The rolling elements are regularly spaced apart circumferentially and held by a cage.
- The rolling elements are balls.
- The first and second races of the rolling bearing are solid.
- The races and the rolling elements define a pitch diameter of the rolling bearing which is parallel to the axis of relative rotation of the first and second races of the rolling bearing.

The races and the rolling elements define a pitch diameter of the rolling bearing which is perpendicular to the axis of relative rotation of the first and second races of the rolling bearing.

The two flanges are in sliding contact at the pitch diameter of the rolling bearing.

The flanges in sliding contact partially cover one another in a contact portion.

At least one flange is fixed securely to a race of the rolling bearing by fixing means, for example by welding, adhesive bonding, moulding, cooperation of mechanical means such as parts of the flange and of the race with matching shapes.

At least one flange provides at least one layer of material made of vibration damping material.

At least one flange provides at least one layer of electrically insulating material so as to prevent the passage of electric current through the rolling bearing.

At least one flange is made of plastic or synthetic material.

At least one flange provides a first part made of rigid material at least partially covering a front edge of one race, a second part made of flexible material being in sliding contact with another flange.

The assembly provides at least two flanges that are secured to one and the same race of the rolling bearing and each at least partially cover a front edge of the race.

The portions extending from the two flanges of one and the same race are annular so as to form an envelope surrounding the race both radially and axially.

Each of the two races provides two flanges on each of their front edges, each flange being in sliding contact with an associated flange of the other race so as to ensure complete sealing of the rolling bearing.

BRIEF DESCRIPTION OF THE SEVERAL VIEWS OF THE DRAWING

The invention will be understood better and further advantages thereof will become more clearly apparent from the following description of embodiments of a rolling bearing assembly in accordance with the principle of the invention, these embodiments being given only by way of example and with reference to the appended non-limiting drawings, in which:

FIG. 3 shows a cross-sectional view of a rolling bearing assembly according to a second embodiment;

FIG. 4 shows a cross-sectional view of a rolling bearing assembly according to a third embodiment; and FIG. 5 shows a cross-sectional view of a rolling bearing assembly according to a fourth embodiment.

DETAILED DESCRIPTION OF THE INVENTION

Figure 1:
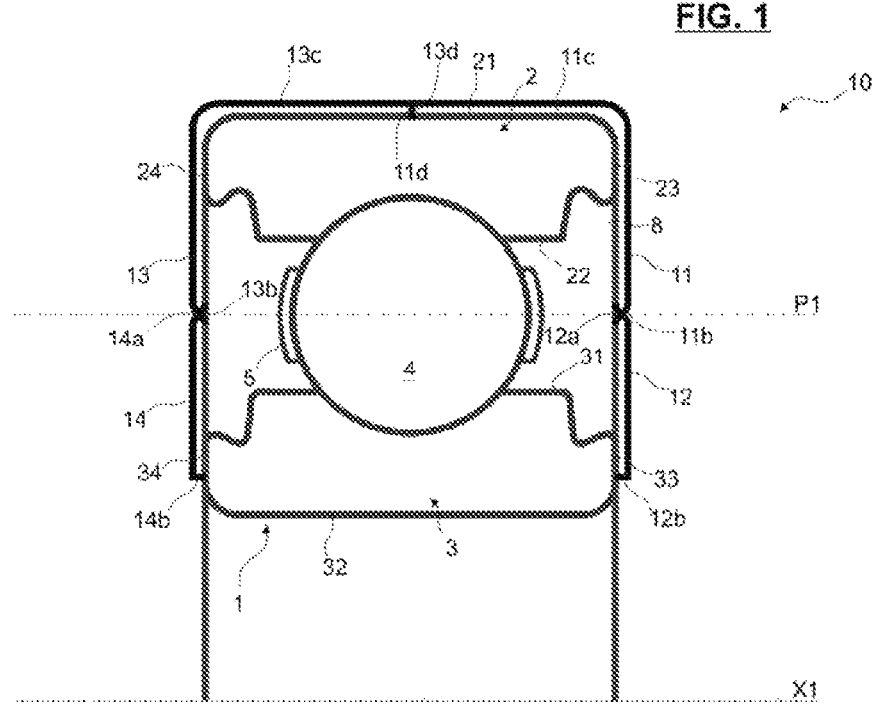
FIG. 1 shows a cross-sectional view of a rolling bearing assembly according to a first embodiment.

An assembly 10 provides a rolling bearing 1 with a central axis X1 of rotation, provided with an outer race 2, an inner race 3, a row of rolling elements 4, in this case balls, that are disposed in parallel planes and held respectively by a cage 5. Such an assembly is intended to be mounted in a housing provided in a mechanical system (not shown).

The races 2, 3 are coaxial with the central axis X1 in a normal operating mode.

The outer race 2 provides an outer cylindrical surface 21, a bore 22 in which a raceway for the rolling elements 4 is formed.

The inner race 3 provides an outer cylindrical surface 31 in which a raceway for the rolling elements 4 is formed.

The inner race 3 may be a turning race and the outer race 2 a non-turning race, or vice versa, or the two races may turn relative to one another about the central axis X1.

The outer race 2 is delimited axially by two radial front edges 23 and 24, and the inner race 3 is delimited axially by two radial front edges 33 and 34 such that the edges are respectively aligned axially so as to define an axial dimension of the rolling bearing 1.

The inner race 3 also provides a cylindrical through-bore 32. For example, a shaft or a mounting can be inserted into the bore 32. The bore 32 in the inner race 3 and the outer cylindrical surface 21 of the outer race 2 define a radial dimension of the rolling bearing.

The cylindrical outer surface 31 of the inner race 3, the bore 22 in the outer race 2 and the radial front edges 23, 33 and 24, 34 define a bearing chamber 8 in which the rolling elements 4 are in motion between the races 2, 3. The bearing chamber 8 can be filled with lubricant, for example grease or oil, in order to reduce friction between the contact surfaces of the moving elements, in this case the rolling elements 4, the raceway provided at the cylindrical outer surface 31 and the raceway provided at the bore 22 in the outer race 2.

The races 2, 3 and the rolling elements 4 define a pitch diameter P1 of the rolling bearing 1 as being an axis of rotation of the rolling elements, the races being in relative rotation parallel to this axis situated between the races.

According to the rotation models illustrated in FIGS. 1 to 5, the pitch diameter P1 is parallel to the central axis X1 of rotation. According to an alternative that is not shown, the pitch diameter P1 can be perpendicular to the central axis.

In accordance with the invention, the assembly 10 also provides radial annular flanges 11, 12, 13 and 14 mounted securely on the races 2, 3 of the rolling bearing 1.

The radial annular flanges 12 and 14 secured to the inner race 3 each provide an outer circumferential lip 12a and 14a, respectively, and an inner circumferential lip 12b and 14b, respectively. The radial annular flanges 11 and 13 secured to the outer race 2 each provide an inner circumferential lip 11b and 13b, respectively, and are both extended by axial portions 11c and 13c, respectively.

The annular flanges 11, 12, 13 and 14 are coaxial with the central axis X1 in a normal operating mode.

The flanges 11 and 13 rest on the radial front edges 23 and 24, respectively, of the outer race 2. The flanges 12 and 14 rest on the radial front edges 33 and 34, respectively, of the inner race 3.

The flanges 12 and 14 are secured to the inner race 3 by fixing means (not shown), for example by welding, adhesive bonding, moulding, cooperation of mechanical means such as parts of the flange and of the race with matching shapes or any other appropriate means.

The axial portions 11c and 13c of the flanges 11, 13 of the outer race 2 are annular and each cover a part of the outer cylindrical surface 21 of the outer race 2 so as to entirely cover the surface 21. According to an alternative embodiment that is not shown, it is possible for the axial portions 11c and 13c not to be annular, the flanges 11 and 13 then being extended by a plurality of axial portions 11c and 13c, respectively.

The axial portions 11c and 13c are securely connected together at their respective axial ends 11d and 13d. The fixing means (not shown) that ensure their connection can consist of a weld, an adhesive bond, a moulding, cooperation of mechanical means of parts of the axial portions with matching shapes or any other appropriate means.

By virtue of the invention, the flanges 11 and 13 are both secured to the outer race 2 by cooperation of their respective axial portions 11c and 13c. It is thus not necessary to fix the flanges 11 and 13 directly to the rolling bearing. The assembly made up of the flanges 11 and 13 with their respective axial portions 11c and 13c defines a U shape in which the outer race 2 is incorporated. Interference can be provided between the radial flanges 11 and 13 and the edges 23 and 24 of the outer race 2 so as to provide rotation prevention.

By virtue of this embodiment, a difference in the radial dimensions between the rolling bearing 1 and the housing in which the assembly 10 is intended to be mounted is compensated by the axial portions 11c and 13c.

The inner circumferential lips 12b, 14b of the flanges 12, 14 respectively mounted on the inner race 3 of the rolling bearing 1 do not overlap the bore 32 in the inner race 3 axially towards the inside.

The outer circumferential lips 12a, 14a of the flanges 12, 14 respectively mounted on the inner race 3 of the rolling bearing 1 come into sliding contact with the inner circumferential lips 11b, 13b of the flanges 11, 13 respectively mounted on the outer race 2 of the rolling bearing 1.

During the relative rotation of the inner race 3 and outer race 2 of the rolling bearing 1, the lips 12a and 11b, 14a and 13b remain in contact and slide over one another.

The difference in the axial dimensions between the rolling bearing 1 and the housing in which the assembly 10 is intended to be mounted is compensated by the flanges 11, 12, 13, 14.

Figure 2:
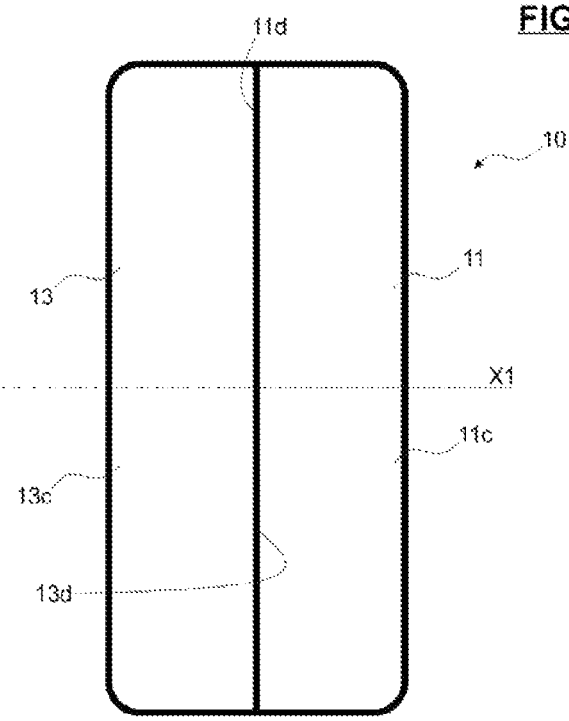
FIG. 2 shows a side view of the rolling bearing assembly of the first embodiment.

According to the embodiment shown in FIGS. 1 and 2, each flange 11, 12, 13, 14 is made of a single material, for example a plastic or synthetic material.

Alternatively, and according to a second embodiment which is illustrated in FIG. 3, the flanges 12 and 14 of the inner race 3 are also extended by axial portions 12c and 14c, respectively.

The axial portions 12c and 14c are annular and each cover a part of the bore 32 in the inner race 3 so as to entirely cover the surface 32. According to an alternative embodiment which is not shown, it is possible for the axial portions 12c and 14c not to be annular, the flanges 12 and 14 then being extended by a plurality of axial portions 12c and 14c, respectively.

The axial portions 12c and 14c are connected securely together at their respective axial ends 12d and 14d.

By virtue of this second embodiment, the flanges 12 and 14 are both secured to the inner race 3 by cooperation of their respective axial portions 12c and 14c. It is then not necessary to fix the flanges 12 and 14 directly to the rolling bearing. The assembly made up of the flanges 12 and 14 with their respective axial portions 12c and 14c defines a U shape in which the inner race 3 is incorporated. Interference can be provided between the radial flanges 12 and 14 and the edges 33 and 34 of the outer race 3 so as to provide rotation prevention.

According to an alternative that is not shown, only the flanges 12 and 14 are extended by axial portions 12c and 14c, respectively, and not the flanges 11 and 13 which are thus similar to those described in FIG. 1.

A third embodiment illustrated in FIG. 4, in which identical elements have the same references, differs from the first embodiment in that the outer circumferential lips 12a, 14a of the flanges 12, 14 respectively mounted on the inner race 3 and the inner circumferential lips 11b, 13b of the flanges 11, 13 respectively mounted on the outer race 2 of the rolling bearing 1 form sealing lips.

The outer circumferential lips 12a, 14a form sealing lips 12e, 14e for the flanges 12 and 14, respectively. The inner circumferential lips 11b, 13b form sealing lips 11e, 13e for the flanges 11 and 13, respectively. The lips 12e, 14e are in sliding contact with the lips 11e, 13e and are all made of a flexible polymeric or synthetic material. For example, the material of the lips may be PA66 reinforced with 30% glass fibre to limit the abrasion thereof.

The flanges 11, 12, 13 and 14 are made of a material that is more rigid than the lips, for example a hard plastic or metal. The lips 11e, 12e, 13e, 14e can be moulded, adhesively bonded or vulcanized for example to the flanges 11, 12, 13 and 14, respectively.

Being sufficiently rigid, the flanges 11, 12, 13, 14 act as contact surfaces for the assembly 10 in its housing. The lips 11e, 12e, 13e, 14e made of more flexible material make it possible to reduce the friction torque while providing sealing.

According to an alternative embodiment that is not shown, only one flange of a pair of flanges in sliding contact is provided with a lip made of flexible material.

A fourth embodiment illustrated in FIG. 5, in which identical elements have the same references, differs from the third embodiment in that the lips 11e, 12e and 13e, 14e in sliding contact are axially superposed.

The flexibility of the flexible material forming the lips allows their axial deformation and thus ensures that they overlap.

By virtue of this fourth embodiment, the contact between two lips 11e, 12e and/or 13e, 14e is preserved even if there is misalignment of the rolling bearing 1 during mounting or use.

According to embodiments that are not shown, the rolling bearing can be provided with one or more rows of rolling elements. The rolling elements can be balls, rollers, needles or any other type of rolling element. By contrast, it is possible for the rolling bearing not to be provided with rolling elements and to consist of a plain bearing.

According to embodiments that are not shown, at least one flange provides at least one layer of material made of vibration damping material and/or at least one flange provides at least one layer of electrically insulating material so as to prevent the passage of electric current through the rolling bearing.

The technical features of the embodiments and variants that are envisaged above can be combined with one another.

The invention claimed is:

1. A rolling bearing assembly mounted in a housing, the assembly comprising:
   a rolling bearing providing:
   a first race including a bore, a first edge and a second edge, an outer cylindrical surface, a first annular flange secured to the first race and covering the first edge of the first race and a second annular flange secured to the first race and covering the second edge of the first race, wherein the first annular flange and the second annular flange are connected and entirely cover the outer cylindrical surface of the first race by being directly secured to the outer cylindrical surface of the first race,
   a second race including a bore, a first edge and a second edge, an outer cylindrical surface, a first annular flange secured to the second race and covering the first edge of the second race, wherein the first annular flange is disconnected from the two annular flanges of the first race, a second annular flange secured to the second race and covering the second edge of the second race, wherein the second annular flange is disconnected from the two annular flanges of the first race, and the bore of the first race and the bore of the second race form a raceway for rolling elements defining an axis of rotation of the roiling elements, and the first race and second race rotate relatively about a central axis (X1), wherein the first annular flange of the first race and the first annular flange of the second race are directly secured to the first race and the second race, respectively, and are in sliding contact with each other without overlapping or interconnecting, wherein the sliding contact is located at the axis of rotation of the rolling elements, and the second annular flange of the first race and the second annular flange of the second race are directly secured to the first race and the second race, respectively, and are in sliding contact with each other without overlapping or interconnecting, wherein the sliding contact is located at the axis of rotation of the rolling elements.

2. The assembly according to claim 1, wherein the first annular flange and the second annular flange are in sliding contact, partially cover one another, in a contact portion.

3. The assembly according to claim 1, wherein at least one of the first annular flange and the second annular flange provides a first part made of rigid material at least partially covering the first edge of one race, and a second part made of flexible material being in sliding contact with another of the first annular flange and the second annular flange.

4. The assembly according to claim 1, wherein portions extending from the first annular flange and the second annular flange of at least one of the first race and the second race are annular and form an envelope surrounding the at least one of the first race and the second race.

* * * * *